United States Patent
Wang et al.

(10) Patent No.: US 6,790,364 B2
(45) Date of Patent: Sep. 14, 2004

(54) PROCESS FOR STRIPPING AMINE BORANE COMPLEX FROM AN ELECTROLESS PLATING SOLUTION

(75) Inventors: Qing Min Wang, Edison, NJ (US); Juzer Jangbarwala, Chino Hills, CA (US)

(73) Assignee: The BOC Group, Inc., New Providence, NJ (US)

(*) Notice: Subject to any disclaimer, the term of this patent is extended or adjusted under 35 U.S.C. 154(b) by 6 days.

(21) Appl. No.: 10/256,861

(22) Filed: Sep. 27, 2002

(65) Prior Publication Data

US 2004/0060874 A1 Apr. 1, 2004

(51) Int. Cl.[7] .............................................. B01D 15/00
(52) U.S. Cl. ....................... 210/668; 210/673; 210/691; 210/692; 210/694

(58) Field of Search ................................. 210/673, 690, 210/691, 692, 694, 908, 668

(56) References Cited

U.S. PATENT DOCUMENTS

| 3,295,999 A | 1/1967 | Klein et al. ............... 106/1.22 |
| 3,338,726 A | 8/1967 | Berzins ....................... 427/438 |
| 6,245,389 B1 * | 6/2001 | Horikawa et al. ......... 427/438 |
| 6,569,307 B2 * | 5/2003 | Blachier et al. ............. 205/82 |

* cited by examiner

*Primary Examiner*—Ivars C. Cintins
(74) *Attorney, Agent, or Firm*—David A. Hey

(57) ABSTRACT

A process for separation and environmentally benign disposal of amine borane complexes includes adsorbing amine borane complex onto a solid support, treating the adsorbed amine borane complex with an oxidizing agent in situ on the adsorbent thereby forming decomposition products without the formation of hydrogen gas, and collecting the decomposition products for disposal thereof.

11 Claims, 3 Drawing Sheets

PROCESS FOR STRIPPING AMINE BORANE COMPLEX FROM AN ELECTROLESS PLATING SOLUTION

This invention relates to removal of an amine borane complex from plating solutions. An amine borane containing plating solution is adsorbed onto a solid support. The solid support is then treated with an oxidizing agent which oxidizes the amine borane without generating hydrogen gas. The oxidized amine borane can be collected for environmentally benign disposal.

BACKGROUND OF THE INVENTION

Electroless plating is a process which allows for the reduction of metal ions in solution and subsequent deposition of metal onto a substrate without the use of electrical energy. The driving force for the reduction of metal ions and their deposition is supplied by a chemical reducing agent in solution, such as an amine borane. Amine boranes are generally prepared by reacting primary, secondary or tertiary amine with diborane in stoichiometric amounts. A number of amine borane complexes useful for metal plating are described in U.S. Pat. No. 3,295,999 and U.S. Pat. No. 3,338,726 both of which are incorporated by reference herein.

Amine borane reducing agents dissociate in neutral, near neutral or acidic pH environments generating copious amounts of hydrogen. For example every mole of dimethylamine borane (DMAB) that dissociates generates approximately 3 moles of hydrogen gas. Typically, when DMAB is used in an electroless plating solution, dissociation is avoided since the electroless chemical deposition solution is always maintained at a highly alkaline pH. However, rinsing with deionized water which is at neutral pH after the deposition step creates conditions conducive to breakdown of a reducing agent such as DMAB. If the rinse station is remotely located from the waste treatment station this can result in hydrogen gas accumulation on the piping to the waste station, a dangerous situation. Such remote location of the rinsing station from the waste station is commonly found in the semiconductor industry where electroless cobalt solutions include amine boranes, for example dialkylamine boranes such as DMAB or diethylamine borane as reducing agents. Typically, the deposition and rinse stations are part of an automated tool located in the fabrication area or clean room. In contrast, waste treatment equipment is typically located outside the fabrication area or clean room remote from the rinsing station.

Unfortunately, while amine borane complexes are useful as reducing agents in electroless plating processes, the disposal of these materials is a significant environmental concern. For example, boron is toxic to plants in excess of a fraction of parts per million (ppm). Therefore, the presence of boron is typically restricted in industrial effluents in areas where municipalities recycle wastewater for irrigation. Accordingly, there is a need for a process that provides for the environmentally benign disposal of amine borane complexes used in industrial processes.

SUMMARY OF THE INVENTION

It is an object of the invention to provide a process for the environmentally benign disposal of amine borane complexes used in plating.

Another object of the invention is to provide a method of separating amine borane complex from plating solutions at a location at or proximate to a rinsing station.

A further object of the invention is to provide a method of reducing the amount of amine borane complex in plating solutions which avoids hydrogen generation.

These and other objects of the invention are achieved by conveying a plating solution including an amine borane complex through an adsorbent bed, adsorbing the amine borane complex on the adsorbent bed, conveying a second solution comprising an oxidizing agent through the adsorbent bed wherein the amine borane complex is oxidized and forms decomposition products and eluting a liquid including the decomposition products from the adsorbent bed, and collecting the eluted amine borane decomposition products.

DETAILED DESCRIPTION OF THE PREFERRED EMBODIMENTS

This invention provides for separating amine borane complexes from electroless plating solutions so that these materials can be disposed of in an environmentally benign manner.

Figure 1:
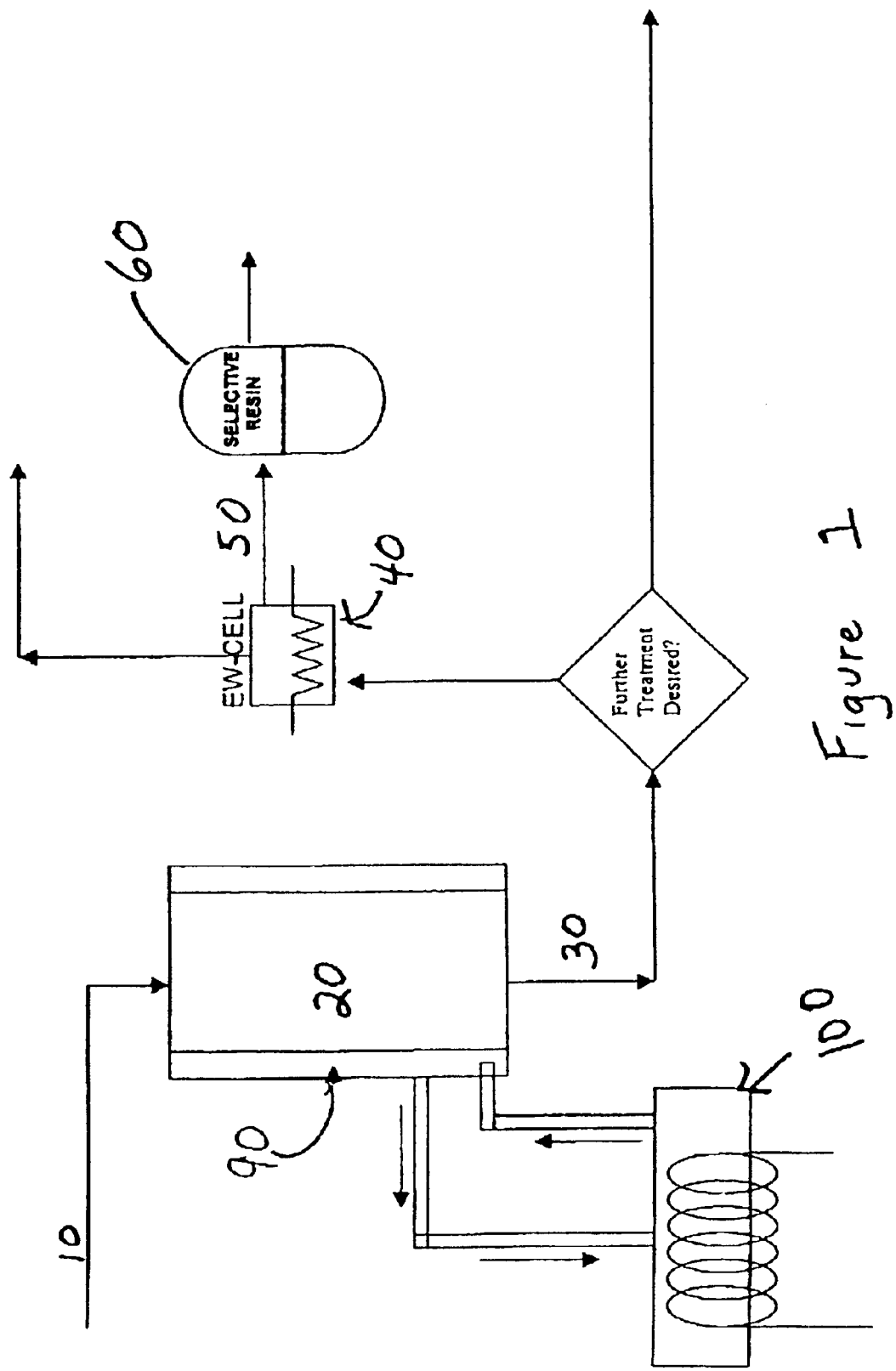
FIG. 1 is a schematic illustration of an arrangement for removing amine borane complex from a plating solution in accordance with the invention.

As can be seen in FIG. 1, waste solution from an electroless plating process including amine borane 10 is pumped through a column 20 containing a regenerable porous adsorbent. Suitable adsorbents include polymeric resins, carbonaceous adsorbent materials such as activated carbon and carbon molecular sieves, silica gel, alumina and zeolites.

Preferred polymeric adsorbents include Ambersorb-563®, Ambersorb-564® Ambersorb-348-F®, Ambersorb-575®, Ambersorb-572® and Ambersorb-1500® available from Rohm & Haas, Optipore 493L available from Dow Chemical and the Macronet MN-100, MN-200, MN-300, MN-300, MN-400, MN-500, MN-600, MN-150, MN-250 and MN-170 resins available from Purolite International, and polyaromatic adsorbents available from Rohm & Haas under brand name Amberlite XAD-2®, Amberlite XAD-4®, Amberlite XAD-16® and acrylic ester based adsorbents having brand name Amberlite XAD-7® and Amberlite XAD-8®.

Upon passing the waste solution 10 through adsorbent bed 20, the amine borane complex is preferentially adsorbed on the adsorbent. The eluate 30 may include toxic metal ions such as copper, cobalt, nickel etc. from the electroplating process. These metal ions may be recovered by electrowinning the eluate 30 in an electrochemical cell 40. The resulting solution may still contain harmful toxic substances such as borates. Further purification can be achieved by conveying the resulting solution 50 through a second adsorbent resin bed for example an ionic resin bed 60. Suitable resins include strong base anionic resins having quaternary amine functional groups. Most preferred is a resin having N-methylglucamine groups such as Amberlite XE-243® available from Rohm & Haas or S-108 available from the Purolite Company. Saturation or breakthrough of amine borane from the absorbent bed 60 can be detected by an oxidation reduction potential (ORP) monitor.

Figure 2:
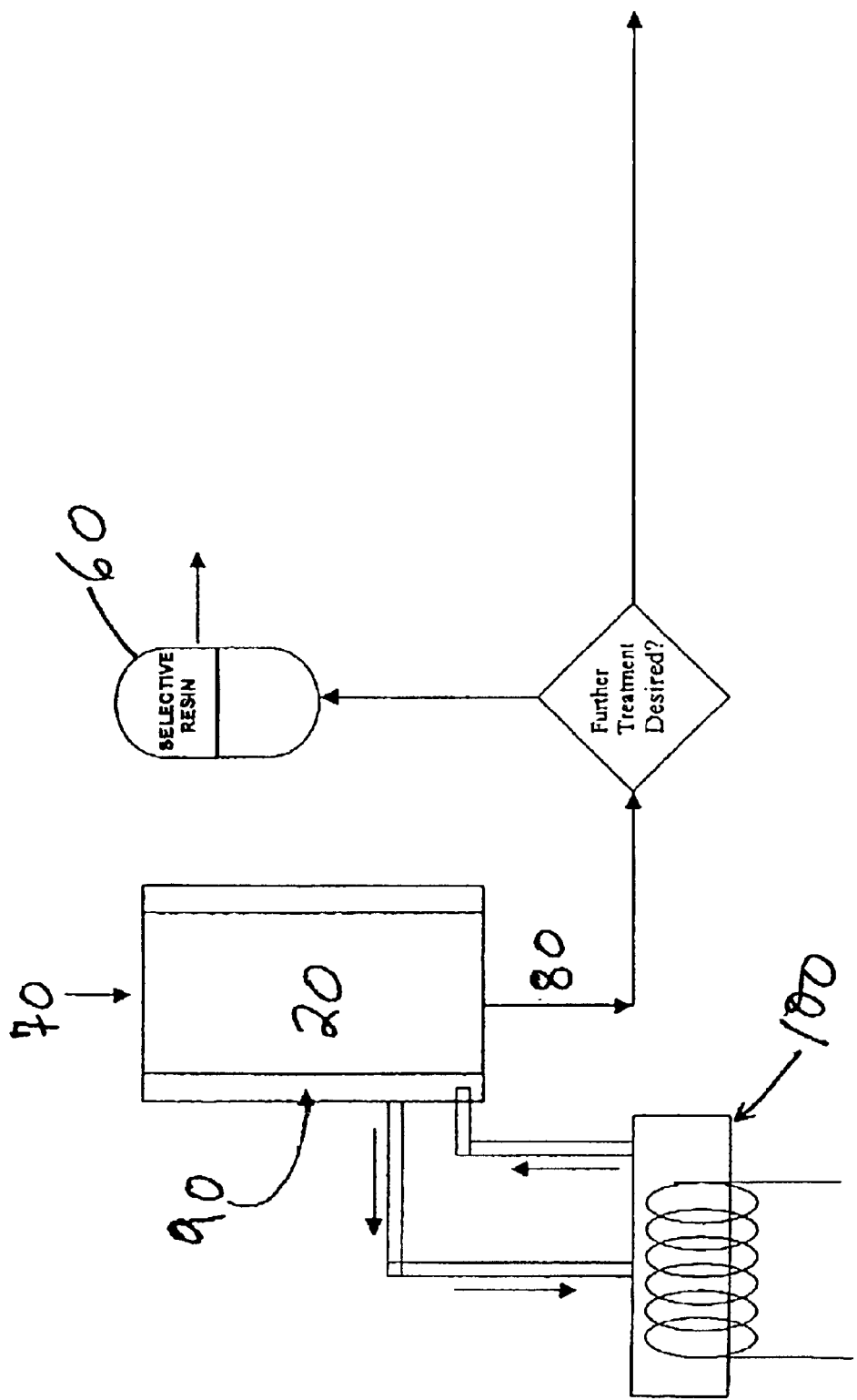
FIG. 2 is a schematic illustration of an arrangement for regenerating an adsorption bed in accordance with the invention.

After the adsorbent bed 20 is saturated with amine borane complex, it can be regenerated as shown in FIG. 2. An oxidizing mobile phase that oxidizes amine borane complex on the adsorbent is passed through the bed. Suitable oxidizing mobile phase components include ketones, aldehydes, carboxylic acids or esters, peroxy acids, other organic materials containing at least one functional group —C=X where X=O, S, or N, and mixtures thereof. These components may also include halogens, ozone, ozonated or ozone saturated water, or a $H_2O_2$/oxidizing catalyst system and mixtures thereof, especially for regeneration of inorganic porous adsorbents. The oxidizing components may be dissolved into a solvent such as water, alcohols or supercritical $CO_2$ to better control the regeneration process. Examples of such oxidants include but are not limited to acetone, 2-butanone, 2,4-pentandione, methyl acetoacetate and $H_2O_2/CH_3ReO_3$.

A preferred mobile phase is acetone or acetone dissolved into a solvent such as ethanol, isopropanol or water. Preferably the solvent is inert to the oxidation or reduction of amine borane. A redox reaction between acetone and an amine borane complex such as dimethylamine borane complex is shown as follows where R=isopropanyl.

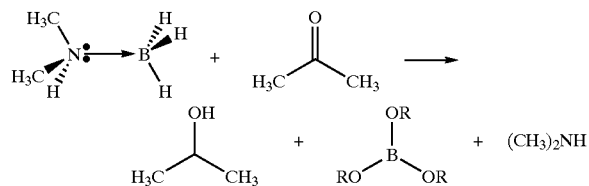

The resulting alcoholic solution 80 is collected for disposal. A solution of 0 to 100%, preferably 2 to 4% by weight oxidant is used for regeneration.

The regeneration reaction is exothermic. Accordingly, the vessel containing the adsorbent is jacketed 90 for heat removal. A heat exchanger 100 connected to a chilled water supply removes heat generated during regeneration. Preferably, the vessel containing the adsorbent is made of a thermally conductive material that is inert to the oxidizing compositions such as 316L stainless steel.

The resulting regenerant solution can be conveyed through the selective resin 60 if it contains acid waste material.

Figure 3:
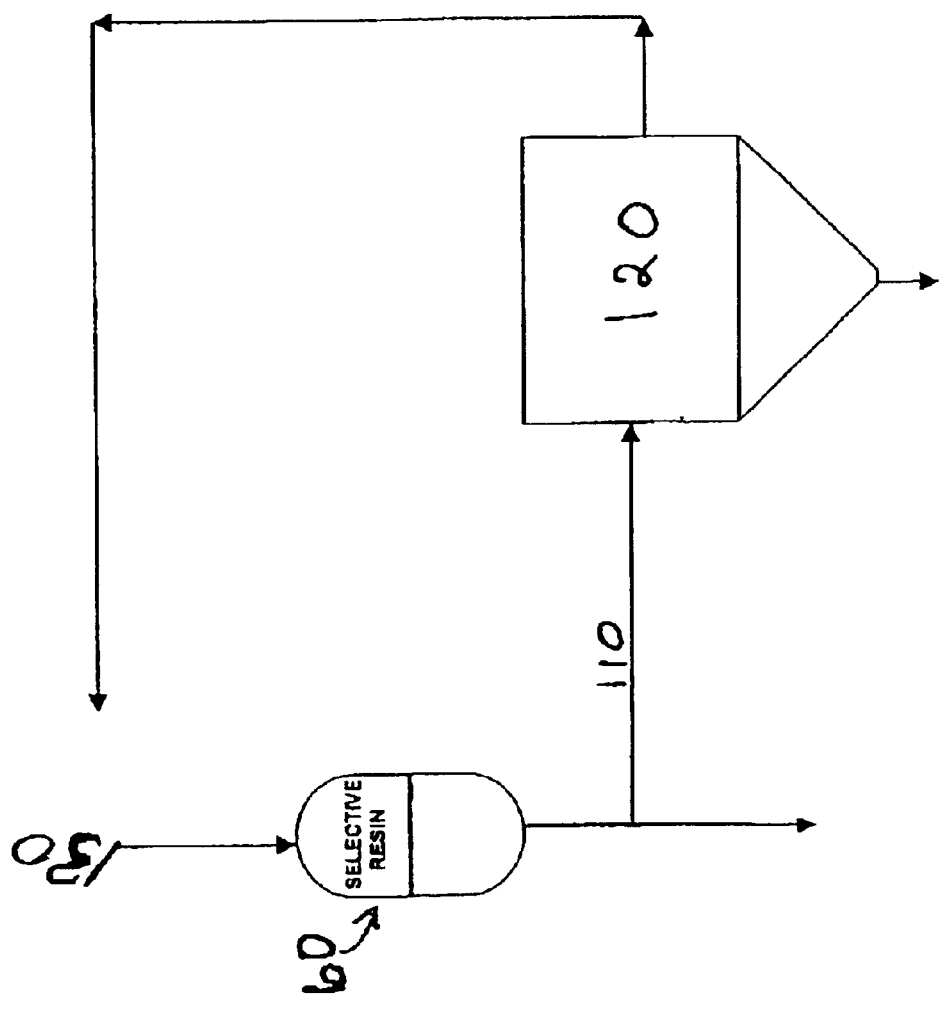
FIG. 3 is a schematic illustration of an arrangement for the regeneration of a selective resin bed in accordance with the invention.

Regeneration of the selective resin 60 is shown in FIG. 3. First an acidic solution 130 is sent through the selective resin 60, protonating the functional group. Borate ion is released forming boric acid in the predominantly acid environment. The acidic eluant 110 can be collected in a tank 120 and reused. When the concentration of boric acid reaches the saturation point it will precipitate as a solid. The solids can be collected for either resale or disposal. The solids can be collected in a decant type arrangement or a pleated filter placed in line.

The above description is illustrative and not limiting. Further modifications will be apparent to one of ordinary skill in the art in light of the disclosure and appended claims.

We claim:

1. A method for separating amine borane complex from a plating solution comprising:

(a) conveying a plating solution including amine borane complex through an adsorbent bed,
   (b) adsorbing the amine borane complex on the adsorbent bed,
   (c) conveying a second solution comprising an oxidizing agent through the adsorbent bed wherein the amine borane complex is oxidized and forms decomposition products,
   (d) eluting the decomposition products from the adsorbent bed, and
   (e) collecting the eluted decomposition products.

2. A method for separating amine borane complex from a plating solution according to claim 1 wherein the second solution comprises at least one oxidizing mobile phase component selected from the group consisting of ketones, aldehydes, carboxylic acids, carboxylic esters, peroxy acids, and organic materials having at least one functional group —C=X where X=O, S or N.

3. A method for separating amine borane complex from a plating solution according to claim 1 wherein the second solution comprises at least one oxidizing mobile phase component selected from the group consisting of halogens, ozone, ozonated or ozone saturated water, and a $H_2O_2$ oxidizing catalyst system.

4. A method for separating amine borane complex from a plating solution according to claim 3 wherein the second solution further comprises at least one solvent selected from the group consisting of water, an alcohol and supercritical $CO_2$.

5. A method for separating amine borane complex from a plating solution according to claim 1 further comprising removing heat from the adsorbent bed.

6. A method for separating amine borane complex from a plating solution according to claim 5 wherein the second solution further comprises at least one solvent selected from the group consisting of water, an alcohol and supercritical $CO_2$.

7. A method for separating amine borane complex from a plating solution according to claim 1 wherein the amine borane complex is a dialkylamine borane complex.

8. A method for separating amine borane complex from a plating solution according to claim 1 wherein the amine borane complex is selected from the group consisting of dimethyl amine borane complex, diethyl amine borane complex and mixtures thereof.

9. A method for separating amine borane complex from a plating solution according to claim 1 wherein the amine borane complex is a dimethylamine borane complex.

10. A method for separating amine borane complex from a plating solution according to claim 1 further comprising collecting eluate after step (d) and conveying the eluate through a second adsorbent bed.

11. A method for separating amine borane complex from a plating solution according to claim 10 further comprising conveying an acidic solution through the second adsorbent bed.

* * * * *